United States Patent
Fukuma et al.

[11] 3,912,458
[45] Oct. 14, 1975

[54] AIR BAG GAS GENERATOR CASING

[75] Inventors: Daizo Fukuma, Tokorozawa; Kensho Shirota, Kodaira, both of Japan

[73] Assignee: Nissan Motor Company Limited, Yokohama, Japan

[22] Filed: Dec. 17, 1973

[21] Appl. No.: 425,533

[30] Foreign Application Priority Data
Dec. 26, 1972 Japan.................................. 47-48717

[52] U.S. Cl. ............... 23/281; 280/150 AB; 102/39; 55/267
[51] Int. Cl.² ...................... B01J 7/00; B60R 21/08
[58] Field of Search ....... 23/281; 141/4, 67; 9/11 A, 9/321; 280/150 AB; 55/267, 523, 517; 210/496; 102/39

[56] References Cited
UNITED STATES PATENTS

| | | | |
|---|---|---|---|
| 3,092,581 | 6/1963 | Jaffe | 210/496 X |
| 3,527,027 | 9/1970 | Knight et al. | 55/523 X |
| 3,663,035 | 5/1972 | Norton | 280/150 AB |
| 3,843,151 | 10/1974 | Lewis | 280/150 AB |
| 3,845,971 | 11/1974 | Hamilton | 55/267 X |
| 3,853,332 | 12/1974 | Lynch | 23/281 X |

*Primary Examiner*—Morris O. Wolk
*Assistant Examiner*—Roger F. Phillips
*Attorney, Agent, or Firm*—Frank J. Jordan

[57] ABSTRACT

A rigid, porous element is disposed between inner and outer perforated cylindrical walls to cool and filter gas generated by a gas generating element located within the inner wall.

8 Claims, 3 Drawing Figures

AIR BAG GAS GENERATOR CASING

This invention generally relates to an air bag safety device for protecting a vehicle passenger, and more particularly to an improved gas generator casing containing a gas generating element which is decomposed to generate gas for inflating the air bag when required.

In existing air bag systems employing an alkali metal azide or an alkaline earth metal as a gas generating agent, decomposition of the gas generating agent produces a large amount of heat. Generated gases usually have an extremely high temperature of about 1000° to 1200°C and contain molten particles of the metal and/or metal oxide. it is therefore necessary to lower the gas temperature and filter out or trap particles of metal and/or metal oxide before introducing the generated gas into the air bag. In this connection, gas generators of existing air bag systems employ casings of double wall construction which are formed from two radially spaced coaxial cylindrical walls each having a plurality of gas releasing holes formed therethrough. The cylindrical cavity between the two cylindrical walls contains a filter material such as powder or particles of silicon dioxide, aluminum oxide or magnesium oxide. Thus, gas generated by decomposition of the gas generating agent passes through the filter to lower the temperature of the gas and at the same time trap molten particles contained in the gas. However, this prior art configuration of a gas generator casing has drawbacks in that powder or particles of the filter material are apt to be carried away by gas through the gas releasing holes in the outer wall of the casing, and that the filter material tends to sink down and compact due to mechanical vibration occurring during operation of the vehicle, leaving a void in the upper portion of the cylindrical cavity between the inner and outer walls. Obviously, the formation of a void results in failure in cooling the expanding gas and also in trapping molten metal or metal oxide particles contained in the gas.

It is therefore an object of the present invention to provide a novel and improved gas generator casing for an air bag safety device for a vehicle which overcomes the aforementioned drawbacks.

It is another object of the present invention to provide a gas generator casing for an air bag safety device which is simple in construction and efficient in operation.

It is still another object of the present invention to provide a gas generator casing for an air bag safety device which is excellent in cooling and filtering expanding gas as compared with existing casings.

It is a further object of the present invention to provide a gas generator casing for an air bag safety device which is resistant to mechanical vibration occurring during operation of a vehicle.

The above and other objects, features and advantages of the present invention will become apparent from the following description taken in conjunction with the accompanying drawings, wherein:

FIG. 1b is a vertical sectional view of the gas generator of FIG. 1a; and

Figure 1A:
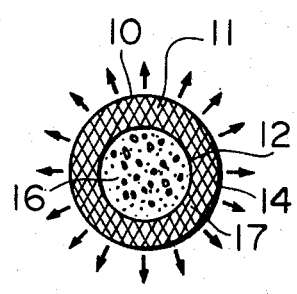
FIG. 1a is an end sectional view of an existing gas generator.
Figure 1B:
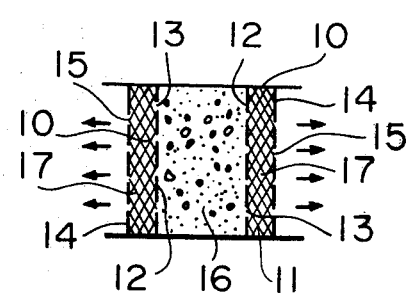

Referring to the drawings and first to FIGS. 1a and 1b, an existing gas generator for an air bag safety device has a casing 11. The casing 11 consists of a cylindrical inner wall 12 with a number of gas releasing holes 13. A cylindrical outer wall 14 which is provided with a number of gas releasing holes 15 is spaced radially outward from the inner wall 12 to define a cylindrical cavity 10 therebetween. A gas generating element 16 formed of an alkali metal azide or an alkaline earth metal is disposed within the inner wall 12. The cavity 10 is filled with powder or particles of a filter material 17 such as silicon dioxide, aluminum oxide or magnesium oxide.

With the gas generator casing of FIGS. 1a and 1b, high temperature gas under pressure is produced upon decomposition of the gas generating element 16. If an alkali metal azide or an alkaline earth metal is used in the gas generating element 16, generated gas will contain molten particles of the metal and/or metal oxide. Generated gas flows out of the casing 11 at high velocity radially as indicated by arrows in FIG. 1b. While the high temperature gas is passing through the interstices in the filter material 17, its temperature is lowered substantially and the molten particles carried by the gas are trapped by the powdery or granular filter material 17.

As mentioned hereinbefore, it has been difficult to maintain the cavity 10 densely packed with filter material 17 since the filter material 17 is compacted by mechanical vibration during operation of the vehicle, forming a void in the upper portion of the cavity 10. As a result, uncooled high temperature gas containing molten particles of metal and/or metal oxide is allowed to flow externally through the void into the air bag. Also particles of the filter material 17 might be carried away by the high pressure gas through the gas releasing holes 15 in the outer wall 14.

Figure 2:
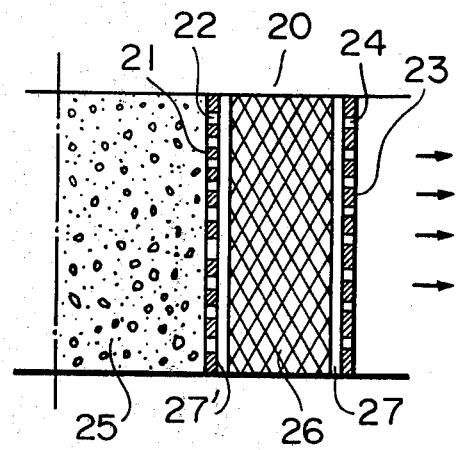
FIG. 2 is a fragmentary vertical sectional view including a gas generator casing embodying the invention.

These difficulties are completely avoided with a gas generator casing of the invention shown in FIG. 2. Similar to the existing gas generator casing 11 shown in FIGS 1a and 1b, a casing 20 of the invention includes a generally cylindrical inner wall 21 with a plurality of gas releasing holes 22, and a generally cylindrical outer wall 23 coaxial and coextensive with the inner wall 21. The outer wall 23 is also formed with a number of gas releasing holes 24. The inner and outer walls 21 and 23 are commonly sealed at both ends by a suitable means. A gas generating element 25 is disposed within the inner wall 21. Interposed between the inner and outer walls 21 and 23 is a generally rigid porous member 26, which is a biscuit made from a metal oxide such as silicon dioxide, aluminum oxide, magnesium oxide or iron oxide, or a silicate mineral such as feldspar.

In order to maintain sufficient gas pressure in the generator and at the same time enhance the filtering effect, it is preferred to provide first and second porous intermediate members 27 and 27' of wire mesh or glass wool on opposite sides of the porous member 26 in close contact with the adjacent surfaces of the outer and inner walls 23 and 21 respectively, as shown in FIG. 2. The porous member 26 may be employed in the form of a cylinder or in any other suitable shape depending upon the profiles of the inner and outer walls.

Expanding gas generated by the gas generating element 25 has a temperature as high as 1000° to 1200°C and contains particles of molten metal and/or metal oxide, particularly when an alkali metal azide or an alkaline earth metal is used in the gas generating element 25. However, with the gas generator casing 20 of FIG.

2, the temperature of the gas is lowered remarkably during passage through the porous member 26. Also, particles of molten metal and metal oxides are trapped by the intermediate members 27 and 27' and the porous member 26.

The gas cooling and filtering efficiency of a gas generator casing 20 of the invention was tested using a porous member 26 of ordinary feldspar ($KA/Si_3O_8$), in the configuration shown in FIG. 2, and a first intermediate member 27 made of glass wool.

1. Gas cooling efficiency test

Thermocouples were placed on the outer surfaces of the inner and outer walls 21 and 23 respectively to measure the gas temperatures inside and outside the gas generator casing 20.

2. Filtering efficiency test

The amount of Na deposited in the glass wool intermediate member 27 was measured to determine the actual filtering efficiency and compare it with the theoretical amount of Na existing in the expanding gas generated by the gas generating element 25.

Test results are as follows:

Temperature of the outer surface of the inner wall 21
... 1000°C

Temperature of the outer surface of the outer wall 23
... 160°C

Na trapping efficiency ... 85–95%

It will be apparent from these test results that a gas generator casing according to the invention is excellent in gas cooling and filtering.

It will also be appreciated that, according to the invention, the porous element 26 is generally rigid and formed as a monolithic block instead of powder or particles, so that it is resistant to mechanical vibrations which occur during operation of a vehicle.

What is claimed is:

1. In a gas generator casing for an air bag safety device of a vehicle, comprising a generally cylindrical inner wall member having a plurality of holes formed therethrough, a generally cylindrical outer wall member coaxially disposed about said inner wall member and having a plurality of holes formed therethrough, said inner and outer walls being commonly sealed at both ends, a generally rigid porous member made of an unglazed substance disposed between said inner and outer wall members to cool and filter gas passing therethrough generated by a gas generating element disposed within said inner wall member.

2. In a gas generator casing according to claim 1, wherein said rigid porous member is made from a metal oxide selected from the group consisting of silicon dioxide, aluminum oxide, magnesium oxide, and iron oxide.

3. In a gas generator casing according to claim 1, wherein said rigid porous member is made from a silicate mineral.

4. In a gas generator casing according to claim 3, wherein said silicate mineral is feldspar.

5. A gas generator casing for an air bag safety device of a vehicle, comprising a generally cylindrical inner wall member having a plurality of holes formed therethrough, a generally cylindrical outer wall member coaxially disposed about said inner wall member and having a plurality of holes formed therethrough, said inner and outer wall members being commonly sealed at both ends, a generally rigid porous member made of an unglazed substance and disposed between said inner and outer wall members to cool and filter gas passing therethrough generated by a gas generating element disposed within said inner wall member, a first porous generally cylindrical intermediate member disposed between said porous member and said outer wall member, and a second porous generally cylindrical intermediate member disposed between said porous member and said inner wall member.

6. A gas generator casing according to claim 5, wherein said first and second porous generally cylindrical intermediate members are formed of wire mesh.

7. A gas generator casing according to claim 5, wherein said first and second porous generally cylindrical intermediate members are formed of glass wool.

8. A gas generator casing according to claim 5, wherein one of said first and second porous generally cylindrical intermediate members is formed of wire mesh, and the other one is formed of glass wool.

* * * * *